March 24, 1959 — H. C. STRICKER, JR — 2,879,076
VEHICLE-TANDEM AXLE AIR SUSPENSION
Filed Jan. 22, 1958 — 3 Sheets-Sheet 1

INVENTOR.
H. C. Stricker Jr.
BY Robb & Robb
Attorneys

March 24, 1959 H. C. STRICKER, JR 2,879,076
VEHICLE-TANDEM AXLE AIR SUSPENSION
Filed Jan. 22, 1958 3 Sheets-Sheet 2

INVENTOR.
H. C. STRICKER JR.
BY
Robb & Robb
attorneys

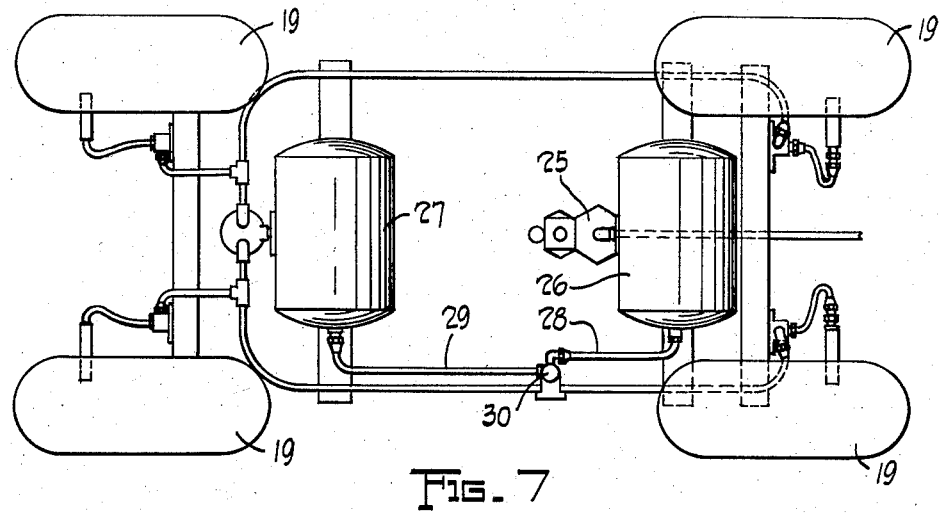
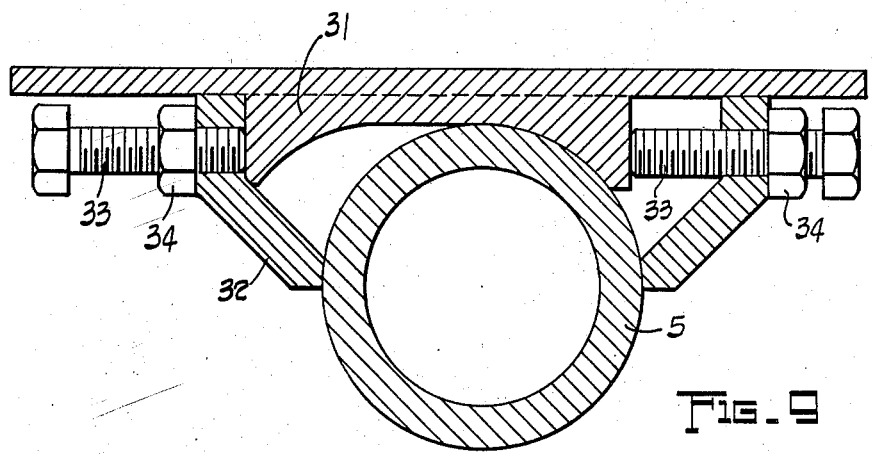
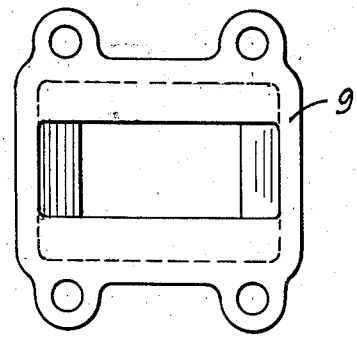

United States Patent Office 2,879,076
Patented Mar. 24, 1959

2,879,076

VEHICLE TANDEM AXLE AIR SUSPENSION

Henry C. Stricker, Jr., Edgerton, Wis., assignor to Highway Trailer Company, Edgerton, Wis., a corporation of Delaware Application January 22, 1958, Serial No. 710,556

6 Claims. (Cl. 280—104.5)

This invention relates to undercarriage and suspension construction, and primarily to that which is particularly suitable for truck trailers or similar heavy duty applications.

As contemplated hereby, air spring or air spring members are to be used and while these are not new per se, the manner in which they are availed of and incorporated in the construction is such as to provide novel, simplified elements, and avoid the use of many parts found in known prior designs.

More specifically the construction provided hereby, is very well adapted for use in conjunction with tandem axles and by the novel arrangement thereof, the imposed load may be distributed in an especially effective manner.

The use of air springs or air spring members and the unique arrangement of certain instrumentalities associated therewith, renders the advantages derived therefrom more important and involves a completely different approach to undercarriage construction.

Having in mind the foregoing, a principal object of this invention is to provide suspension construction which avails of air spring members and beams, in a simple effective combination to improve the riding qualities and general operating characteristics of a vehicle in which the suspension is incorporated.

A further object of the invention is to arrange the air spring members with respect to the axle or axles as the case may be, whereby imposed loads are in part distributed to other portions of the suspension mechanism.

Yet another object of the invention is to provide novel beams of a form which act as compression reservoirs, being directly connected with air spring members mounted thereon.

A further important object of the invention is to provide novel axle construction availing of a two-part member which serves a dual function of limiting lateral motion and reducing the effect of longitudinal changes in the positions of wheels carried by each part.

A still further object of the invention is to provide a tandem suspension construction, availing of the factors heretofore described as constituting certain of the improvements hereof, to still further enhance the simplicity, effectiveness and advantages residing in the incorporation of air spring members in the structure.

By the improvement of the riding qualities resulting from the construction set forth herein, an increase in life of other components of the vehicle will be a virtually inevitable result, since shocks on the various parts will be reduced and breakage of spring members eliminated.

Other and further objects of the invention will be understood from a consideration of the specification appended hereto and shown in the drawings wherein:

Figure 7 is a plan view, somewhat diagrammatic in nature illustrating certain components of the controls, supplies and connections therefor in reference to the air spring members availed of.

Figure 9 is an enlarged fragmentary view illustrating certain adjusting means availed of to align axles in tandem suspension.

Figure 10 is a view in plan, of an axle chair as shown in Figure 9.

Figure 1:
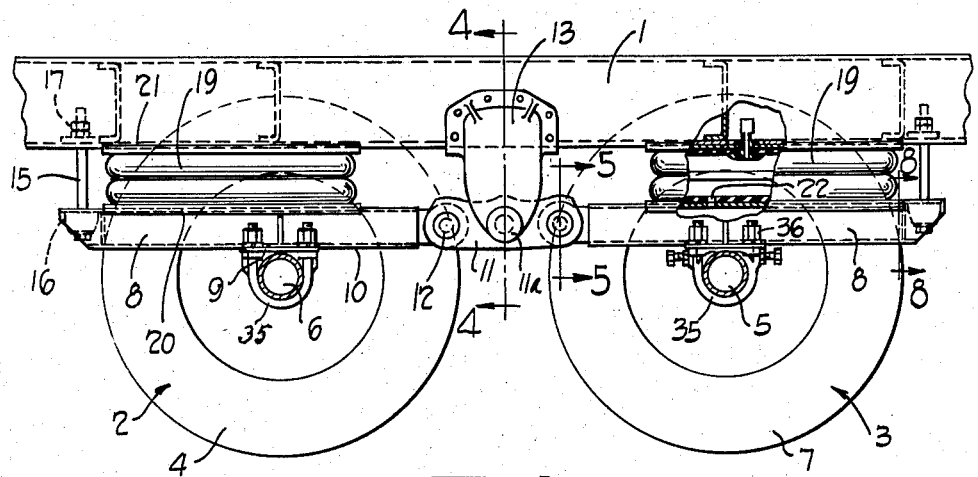
Figure 1 is an elevational view, somewhat fragmentary in nature and in section likewise illustrating an undercarriage suspension of the tandem type incorporating structure hereof therein.
Figure 4:
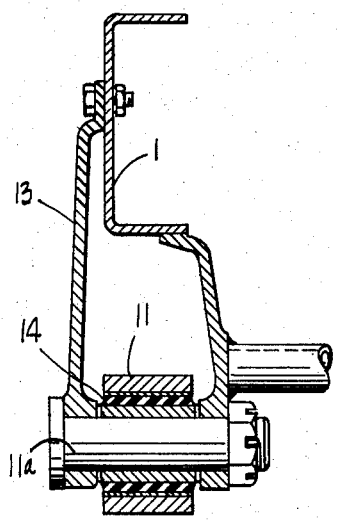
Figure 4 is a fragmentary view in section taken about on the line 4—4 of Figure 1 looking in the direction of the arrows.
Figure 5:
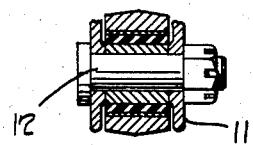
Figure 5 is an enlarged fragmentary view taken about on the line 5—5 of Figure 1 looking in the direction of the arrows.

Referring now to the drawings and particularly initially Figures 1 and 4, a chassis frame generally designated 1 is shown, in somewhat fragmentary illustration, the same usually being incorporated in a truck trailer body for example, and in this instance being supported by the tandem suspension mechanism shown therebelow, wherein a wheel and axle unit designated generally 2 is shown at the left and a wheel and axle unit 3 is shown at the right hand portion of said view.

Figure 3:
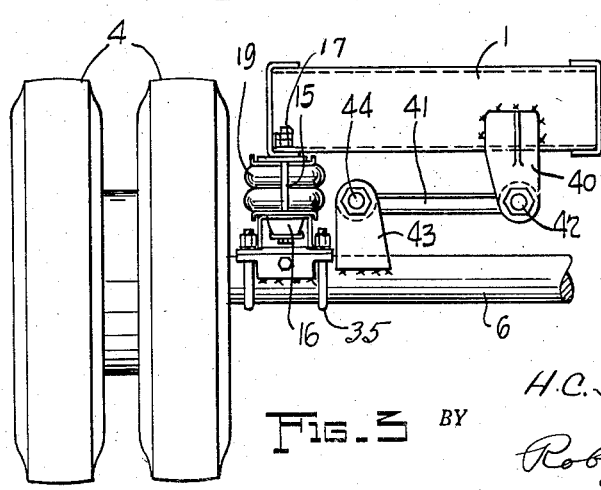
Figure 3 is a rear view of a tandem suspension, being somewhat fragmentary in nature showing a torque arm as incorporated therein to regulate lateral displacement of the axle and associated parts.

The wheel and axle unit 2 for example will include therein the wheel 4 and axle 6, which may be an axle such as is shown in Figure 3 and wheel 4 of course will be of the dual type involving in essence two wheels each being designated 4 for purposes of simplification hereof.

The other wheel and axle unit 3 will be similarly constructed involving a transverse axle 5 and wheels and tires 7 thereon.

In order to secure the wheel and axle units to the chassis frame 1, the unit of Figure 1 denoted 2 will be described, and it will be understood that the unit 3 will be similarly connected to the chassis frame.

Figure 8:
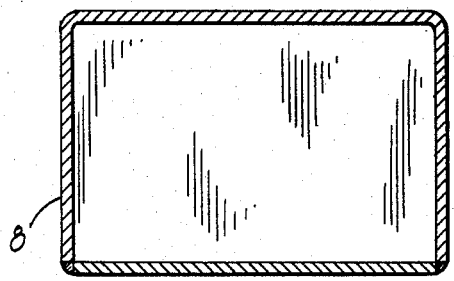
Figure 8 is an enlarged sectional view taken about on the line 8—8 of Figure 1 looking in the direction of the arrows showing the form of reservoir beam used.

Turning therefore to a consideration of the connection above referred to, it will be noted that a beam member 8 is provided, the same being of generally rectangular cross section as illustrated in Figure 8 and having mounted therebelow a suitable chair such as 9 the chair at one side of the frame being adjustable as will be subsequently described and the other one not being required to be adjustable as will be understood by those skilled in the art. The chair may be of course affixed to the lower side 10 of the beam 8, the beam being designated a reservoir beam for purposes which will be explained as this description proceeds, since the beam is actually hollow all the way through and is air tight.

The beam 8 is connected at its right hand end to an equalizer 11, which connection is effected at the pivotal point 12 in order to provide for vertical pivotal motion of the beam 8 and its associated parts.

The equalizer 11 is of course in turn pivotally mounted on equalizer bracket 13 extending downwardly from the chassis frame 1 and more particularly shown in detail in Figure 4 as involving a rubber bushing 14 upon which the equalizer member 11 is mounted.

The other end of the beam 8 is provided with a snubbing member including a vertically extending rod 15 having a rubber cushioned head 16 thereon and being suitably fastened to the chassis frame by nuts such as 17. The purpose of the snubber is to limit the expansion action of the air spring member which is designated 19 and in this case is comprised of an elongated unit, suitably fastened at its lowermost portion to the upper surface of the reservoir beam 8 at 20 and its upper portion to the lowermost surface of the chassis frame 1 as at 21.

This air spring member is of suitable resilient construction and adapted to retain and be provided with an air supply as will be set forth hereinafter. It should be noted however, that as indicated in Figure 1 the interior of the air spring member 19 is connected by means of a suitable opening 22 to the interior of the reservoir beam 8, whereby there is constant communication between the two and the beam 8 provides a reservoir for additional quantity of air as is highly desirable for the best operation of the apparatus or mechanism as a whole.

It is of course noted that both beams 8 shown as connected to the wheel and axle assembly 2 and 3 are substantially identical, in fact they are identical one being directed toward the rear and the other toward the front of the chassis frame as is shown in the drawing and extending pivotally from the equalizer 11 in each case. It is also noted that the equalizer beams are furnished in pairs at each side of the frame and connected of course to wheels at the opposite side by means of suitable chairs one of the chairs at the opposite side being adjustable in accordance with desirable construction for alignment purposes.

It is here pointed out that each one of the air springs 19, being of elongated construction as illustrated, is arranged with respect to its associated reservoir beam 8 in such a manner as to divide the imposed load in a definite proportion, and thus not place the entire imposed load on the air spring itself. In this instance of course the air spring member 19 at the left in Figure 1 is arranged to transfer about 18 or 20 percent of the imposed load to the equalizer 11 at the pivotal point 12 thereof, the equalizer of course being pivoted at 11a in the manner suggested heretofore in reference to Figure 4. The balance of the imposed load is of course absorbed by the air spring and in each case of the air spring member 19 illustrated similar proportioning of or division of the imposed load is effected. This may obviously be changed in regard to proportion as is desired but this particular disclosure has been found to be satisfactory for the purposes hereof.

While the supply of air to the air spring members is largely conventional, it is illustrated in Figure 7 as including a suitable pump such as 25 which is adapted to supply storage tanks 26 and 27, which storage tanks are in turn connected by suitable piping such as 28 and 29 to the necessary valves and control elements 30, the valve 30 for example regulating the flow to the individual control valves provided at each air spring unit or member 19. The operation of this air supply is largely conventional and responsive to the loads carried by the vehicle in which the air spring members are incorporated so that when additional loads are placed in the vehicle, further air is admitted to the individual air springs to compensate and maintain the vehicle body height substantially constant at all times.

As the vehicle travels over the surface of course, the changes in position of a wheel and axle assembly are imparted to the air spring and the reservoir beam 8 in this case supplies the additional cushioning effect necessary as immediately responsive to such changes. The vertical changes are compensated for in part by the air spring members 19 themselves and of course a certain portion of the change is imparted to the equalizer 11 and smoothed out by transfer therethrough to the other air spring member for example as will be understood from a consideration of the normal operating characteristics of an apparatus of this kind.

In order to provide for alignment of the axles such as 5 and 6, the disclosure in Figure 9 is resorted to and illustrates the axle 5 as being received in an adjustable chair which is denoted 31, the chair providing for adjustment by means of a bracket 32 which is in turn operated by suitable bolts 33 lock nuts 34 being provided to fix the position once reached. When the bracket 32 is moved by the manipulation of the bolts 33 in a manner which will be apparent, it will move the axle 5 in the chair 31 as necessary to accommodate for alignment and then the lock nuts 34 may be fixed. Of course suitable U-bolts such as are illustrated at 35 are provided to fix the axle 5 for example in its adjusted location, the connection of the U-bolts 35 with the reservoir beam 8 being by means of slots provided in the connection with the said reservoir beam and the nuts 36 on the U-bolts being manipulated to fix the axle in its adjusted position, all the foregoing largely conventional but necessary in any axle undercarriage arrangement.

Figure 2:
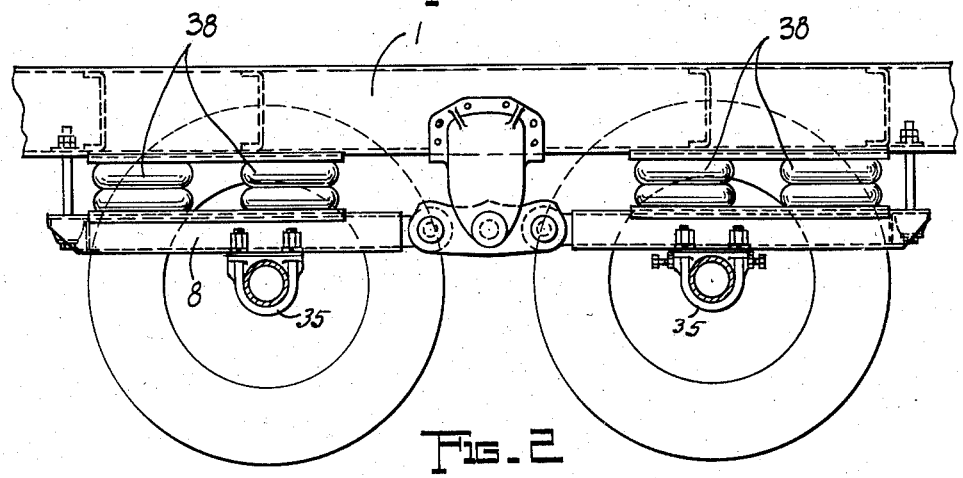
Figure 2 is a view similar to Figure 1 showing a modified form of tandem suspension.

In the Figure 2 disclosure, different air spring members are provided, these being designated 38 and in this case furnished in pairs, the members being cylindrical in plan section and arranged so as to be connected to the chassis frame 1 and the reservoir beam 8 in each case in the same manner. The actual positioning of the air spring members 38 is such as to divide the imposed load in a manner similar to that where a single air spring member such as 19 is used in reference to the Figure 1 disclosure. Of course the air spring members 38 are likewise connected by suitable connections to the interior of the reservoir beams 8 so as to provide for the additional cushioning effect of air which is under pressure in both the spring members 38 and the beams 8. Other than the foregoing the balance of the structure is substantially identical to that described in reference to Figure 1 and is not further set forth in detail.

In order to control lateral motion of the axle and wheel units such as 2 and 3, a suitable torque arm construction may be resorted to and is illustrated in Figure 3 involving a bracket such as 40 fastened to the chassis frame 1 and extending downwardly therefrom, an arm 41 being provided and pivotally connected at 42 to the said bracket 40. A further bracket 43 is arranged to be permanently fastened to the axle such as 6 and pivotally connected to the arm 41 at 44. It will be apparent from the foregoing that lateral motion of the axle 6 is definitely limited by the torque arm 41 and vertical motion is not affected adversely thereby, the lateral motion therefore not being imposed entirely upon the air spring members 19 or upon the snubbers 15 including the parts 15—16.

Figure 6:
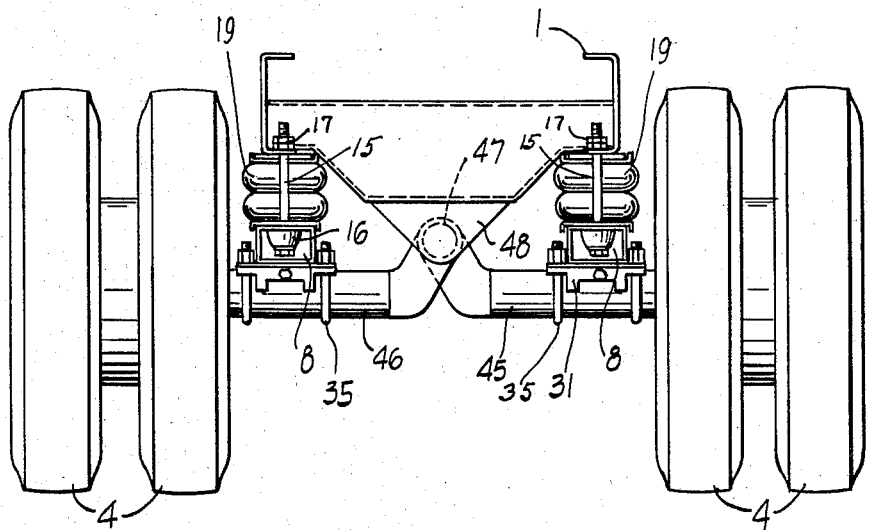
Figure 6 is a rear elevation of a suspension mechanism incorporating a two-part axle therein.

Turning to a consideration of Figure 6 there is here shown a novel axle construction which is particularly advantageously used with air spring members such as 19, because there is no necessity to provide separate torque arms and changes in axle attitude or wheel attitude of the respective sides of the axle and wheel units are not necessarily transferred to the opposite side or corresponding pair as the case may be.

In this disclosure, the axle is shown as being comprised of two parts such as 45 and 46, connected to the wheels such as 4 at opposite sides of the vehicle, the chassis frame being indicated at 1 and the air spring members 19 of course being illustrated in end view, as being connected to the reservoir beams 8, the beams in turn to the chairs 31 and U-bolts 35. The axle members 45 and 46 are pivotally connected at 47 to a downwardly depending bracket 48 in turn suitably fastened to the chassis frame 1.

From the foregoing it will be understood that when the wheels 4 at the left hand side of the vehicle for example are caused to ride over an obstruction, the air spring members provided therefore will handle the shock load in the usual manner without necessarily affecting the wheels 4 and airspring member 19 at the opposite side since the axles are separate. It is explained that of course each axle of the tandem unit if this be the type of installation, will be similarly arranged and pivotally mounted so as to provide two part construction.

While there is here illustrated a construction where a tandem axle unit is availed of, it should be understood that under some circumstances a single axle unit is entirely feasible by fixing the pivot 12 to a bracket such as the equalizer bracket 13 and availing of the balance of the mechanism in a similar manner including the air spring member 19 and reservoir beam 8. In this instance of course the tandem pair would not be provided but a similar simplified advantage would be present in the air spring arrangement and the division of the imposed load provided thereby, with the advantages to be derived from air spring application being readily apparent and understood by those skilled in the art.

I claim:

1. In suspension mechanism of the class described, in combination, a chassis frame, tandem wheel and transverse axle means therefore, including longitudinally spaced transverse axle members, air spring units connected to each of the axles and the frame at opposite sides of the latter, a unit being provided at the end of each axle, each unit comprising a reservoir beam connected to an axle and an individual air spring device mounted thereon fastened to the frame and beam, the interior of said beam communicating with the interior of the device, and an equalizer intermediate the ends of adjacent beams, pivotally connected to the frame and beams, said air spring device of each unit being located on the beam and with respect to the center line of the axle connection therewith, whereby a substantial portion of the imposed load is distributed to the ends of the beams at their connections with the equalizer.

2. The combination as claimed in claim 1, wherein the equalizer member is pivotally connected to the chassis frame, the portion of the imposed load referred to is thereby transmitted to said connection, and a snubbing device is connected to the other end of the beam and the chassis frame, to limit movement of said other end.

3. The combination as claimed in claim 1, wherein the air spring device comprises an elongated flexible air containing member, said member being mounted on the beam with a minor portion thereof extending between the center line of each axle and the pivotal connection of the beam and equalizer.

4. The combination as claimed in claim 1, wherein each axle member is comprised of two parts, each part being pivotally connected to the frame whereby the respective axle parts are independently movable.

5. The combination as claimed in claim 1, wherein means are provided to limit lateral movement of the axles, and snubbing parts are arranged to limit movement of the ends of the beams opposite the pivotal connections aforesaid.

6. The combination as claimed in claim 1, wherein each axle member is divided about centrally of the frame and pivotally connected to said frame by means extending therefrom.

References Cited in the file of this patent

UNITED STATES PATENTS

| | | |
|---|---|---|
| 1,745,433 | Marcum | Feb. 4, 1930 |
| 2,112,112 | Porsche | Mar. 22, 1938 |
| 2,290,620 | Brown | July 21, 1942 |
| 2,814,480 | Clark | Nov. 26, 1957 |
| 2,827,282 | Weiss | Mar. 18, 1958 |